(12) United States Patent
Kim et al.

(10) Patent No.: US 8,167,967 B2
(45) Date of Patent: May 1, 2012

(54) RECEPTACLE FILTER FOR CHARGING HYDROGEN

(75) Inventors: Sang Hyun Kim, Gyeonggi-do (KR); Ki Ho Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 367 days.

(21) Appl. No.: 12/550,669

(22) Filed: Aug. 31, 2009

(65) Prior Publication Data

US 2010/0287897 A1    Nov. 18, 2010

(30) Foreign Application Priority Data

May 12, 2009   (KR) .................. 10-2009-0041092

(51) Int. Cl.
*B01D 35/153*   (2006.01)
*B01D 39/10*    (2006.01)

(52) U.S. Cl. ................... 55/385.3; 55/420; 55/523

(58) Field of Classification Search ........... 96/108, 96/134; 55/385.3, 385.4, 420, 523, 529
See application file for complete search history.

(56) References Cited

U.S. PATENT DOCUMENTS

| 2,273,589 | A | * | 2/1942 | Olt ..................................... 419/2 |
| 2,297,817 | A | * | 10/1942 | Truxell, Jr. et al. ........... 210/496 |
| 2,576,610 | A | * | 11/1951 | Kunzog ........................... 138/41 |
| 2,653,444 | A | * | 9/1953 | Oishei ............................ 60/396 |
| 4,135,621 | A |   | 1/1979 | Turillon et al. |
| 5,409,514 | A | * | 4/1995 | Ragusa et al. .................. 55/319 |
| 5,490,868 | A | * | 2/1996 | Whitlock et al. ............... 55/503 |
| 5,536,402 | A | * | 7/1996 | Kluhsman ..................... 210/232 |
| 5,564,755 | A | * | 10/1996 | Ackermann et al. .......... 285/191 |
| 5,902,381 | A | * | 5/1999 | Golner et al. ................... 96/146 |
| 6,210,458 | B1 |   | 4/2001 | Shindo et al. |
| 6,911,065 | B2 | * | 6/2005 | Watanabe et al. ................. 95/90 |
| 7,160,359 | B2 | * | 1/2007 | Vincent et al. .................... 95/90 |

FOREIGN PATENT DOCUMENTS

JP        2003-245564 A    9/2003
KR    10-2009-0010221 A    1/2009

* cited by examiner

*Primary Examiner* — Frank Lawrence, Jr.
(74) *Attorney, Agent, or Firm* — Edwards Wildman Palmer LLP; Peter F. Corless

(57) ABSTRACT

The present invention provides a receptacle filter for charging hydrogen which can reliably remove impurities from hydrogen gas when charging hydrogen into a tank. The receptacle filter of the present invention includes a filtering unit which removes impurities from hydrogen gas, and a one-way control valve which controls the flow direction of hydrogen gas.

9 Claims, 5 Drawing Sheets

RECEPTACLE FILTER FOR CHARGING HYDROGEN

CROSS-REFERENCE TO RELATED APPLICATION

This application claims under 35 U.S.C. §119 a the benefit of Korean Patent Application No. 10-2009-0041092 filed May 12, 2009, the entire contents of which are incorporated herein by reference.

BACKGROUND (a) Technical Field

The present disclosure relates, in general, to a receptacle filter for charging hydrogen. In particular embodiment, it relates to a receptacle filter for charging hydrogen which can reliably remove impurities from hydrogen gas when charging hydrogen into a tank by virtue of the structure in which a filtering unit manufactured by sintering metal powder is suitably installed in a receptacle for charging hydrogen.

(b) Background Art

Generally, fuel cell vehicles using hydrogen as their fuel include one or more hydrogen tanks under a pressure of 350 bar or 700 bar.

In a system for charging hydrogen into such a hydrogen tank, the pressure in the hydrogen tank is suitably measured by a pressure sensor which is preferably provided in a dispenser of a hydrogen charging station or in the hydrogen tank, and when the measured pressure reaches the desired pressure, the charging is suitably stopped.

Preferably, when charging hydrogen into the hydrogen tank, a receptacle for charging high-pressure hydrogen is typically used, functioning as a kind of connector. In further preferred embodiments, a filter is installed in the receptacle to remove impurities from hydrogen gas when it is being charged.

According to certain preferred embodiments, in the system for charging high-pressure hydrogen into the hydrogen tank and storing it therein, two filters are suitably arranged in a direction in which hydrogen gas is suitably charged into the hydrogen tank. Preferably, one of the filters is suitably installed in the receptacle at an upstream side with respect to the charging direction of hydrogen and suitably functions to remove impurities from hydrogen gas drawn from the hydrogen station. In further embodiments, the other one of the filters is a regulator filter which is suitably disposed behind the filter installed in the receptacle and serves to remove impurities to prevent the impurities from entering a fuel cell stack.

Preferably, the filter installed in the receptacle has a fine porous structure having pores ranging from 40 μm to 50 μm in diameter. According to further embodiments, this filter first removes impurities from hydrogen gas when charging it into the tank. Preferably, the regulator filter is disposed in the front of a regulator and has a mesh structure. When hydrogen gas is reduced in pressure from 350 bar or 700 bar to 10 bar by the regulator, the regulator filters hydrogen gas to prevent impurities from entering the fuel cell stack.

Hereinafter, the construction of a conventional receptacle filter will be explained according to certain preferred embodiments of the present invention.

Preferably, as a representative example of the conventional technique, for example as shown in FIG. 4, a filter 100 for fluid pipes was proposed in Korean Patent Registration No. 10-790199, incorporated by reference in its entirety herein. Preferably, the filter 100 includes a filter body 104 which has fluid passing holes 102 therein, and a spring wire 106 which is suitably wound around the surface of the filter body 104 and preferably covers the fluid passing holes 102 to function as a filtering member. However, the conventional receptacle filter has a relatively large number of components and a complex structure, wherein the complex structure is such that the fluid passing holes must be suitably formed through the filter body 104 and the spring wire must be suitably wound around the surface of the filter body 104 in several turns or several tens of turns. Further, the filtering of hydrogen gas is suitably realized by fine gaps between the wound portions of the spring wire, but the fine gaps are relatively large so that hydrogen gas too easily passes through the fine gaps, thus suitably deteriorating the filtering performance.

Another example of the conventional technique was proposed a filter in which a filter body preferably made of SUS has as part of its own construction a plurality of fine pores. However according to this construction, impurities cannot be satisfactorily removed from hydrogen gas just by the fine pores.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a receptacle filter for charging hydrogen which is preferably installed in a receptacle body and is suitably formed in a predetermined shape by sintering metal powder which has suitably superior corrosion resistance and is resistant to hydrogen brittleness, thus reliably removing impurities from hydrogen gas when suitably charging the hydrogen gas, and reducing the production cost by virtue of the simplicity of its structure and by having a small number of components.

In a preferred aspect, the present invention provides a receptacle filter for charging hydrogen including: a filtering unit to suitably remove impurities from hydrogen gas; and a one-way valve for suitably controlling a flow direction of the hydrogen gas, wherein the filtering unit preferably includes: a support body coupled to the one-way valve to support the one-way valve; and a metal powder filtering member that is suitably integrally provided on a front surface of the support body.

In a preferred embodiment, the filtering member may have a conical shape which is suitably reduced in diameter from a proximal end thereof adjacent to the front surface of the support body to a distal end thereof.

In another preferred embodiment, the metal powder filtering member may be formed by suitably seating the support body into a mold, charging metal powder into the mold ahead of the support body, and heating the metal powder at a predetermined temperature and sintering the metal powder such that the particles of metal powder are suitably bound to each other and fine pores are formed therein.

In still another preferred embodiment, the metal powder may comprise 90% Cu-10% Sn which is suitably resistant to hydrogen brittleness.

In yet another preferred embodiment, the metal powder may comprise one selected from, but not limited to, SUS304, SUS304L, SUS308, SUS316, SUS321, SUS347, brass, copper-nickel alloy and aluminum alloy.

According to certain preferred embodiments, the present invention described herein, having the above-construction, provides the following effects.

In the present invention, a filtering member is suitably formed by heating and sintering powder of copper or a copper alloy which has superior corrosion resistance and is resistant to hydrogen brittleness, such that particles thereof are suitably bound to each other. Preferably, the filtering member is suitably installed in a receptacle for charging hydrogen. Accordingly, the present invention in preferred embodiments is able to reliably conduct a function of removing impurities from hydrogen and, preferably, is further also able reduce the number of components and suitably simplify the structure, thus markedly reducing the production cost, compared to the conventional filter. Preferably, the present invention can suitably contribute to the localization of products in the market.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
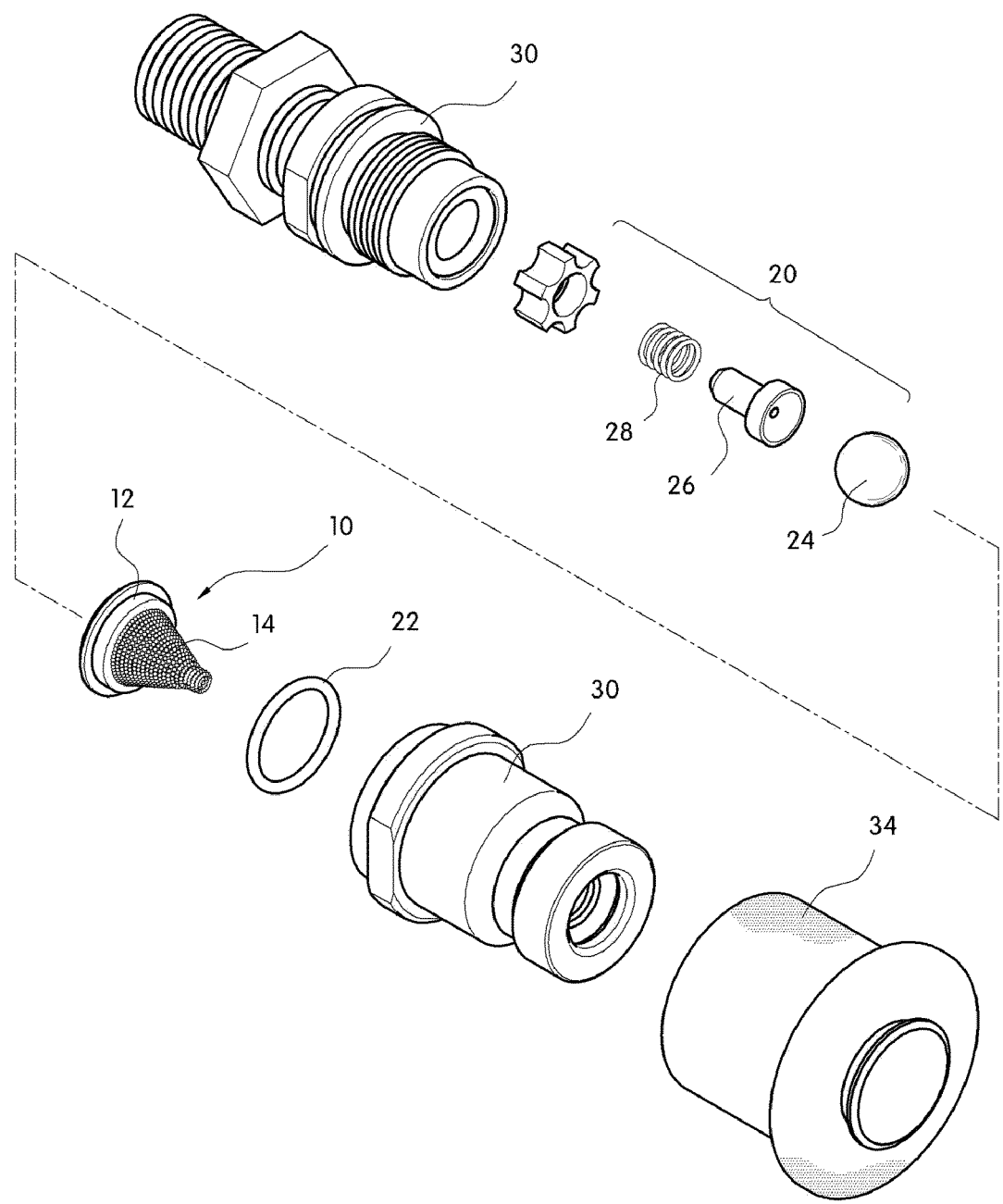
FIG. 1 is an exploded perspective view illustrating the construction of a receptacle filter for charging hydrogen, according to a preferred embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present invention features a receptacle filter for charging hydrogen comprising a filtering unit to remove impurities from hydrogen gas; and a one-way valve for controlling a flow direction of the hydrogen gas.

In one embodiment, the filtering unit comprises a support body coupled to the one-way valve to support the one-way valve and a metal powder filtering member.

In another embodiment, the metal powder filtering member is integrally provided on a front surface of the support body.

In another further embodiment, the filtering member has a conical shape.

In still another further embodiment, the conical shape is reduced in diameter from a proximal end thereof adjacent to the front surface of the support body to a distal end thereof.

The invention also features a motor vehicle that comprises the receptacle filter for charging hydrogen described in any one of the aspects herein.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2A:
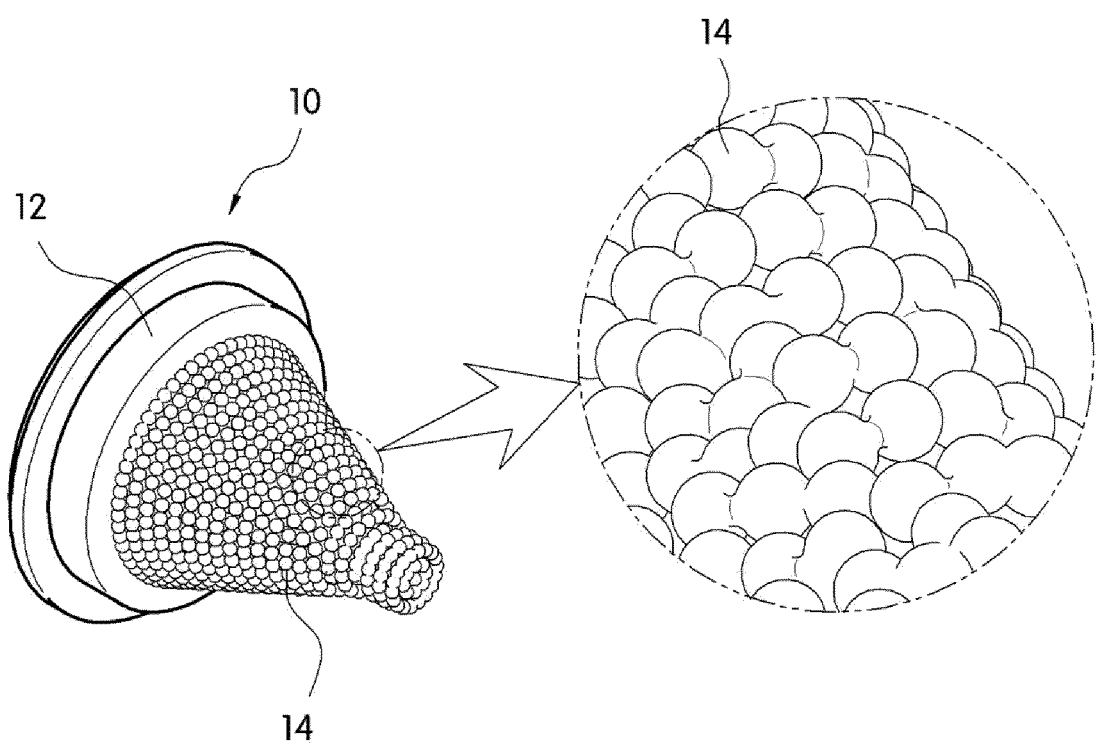
FIGS. 2A and 2B are perspective views showing a metal powder filtering member which, according to certain preferred embodiments, is a critical part of the receptacle filter according to the present invention.
Figure 2B:
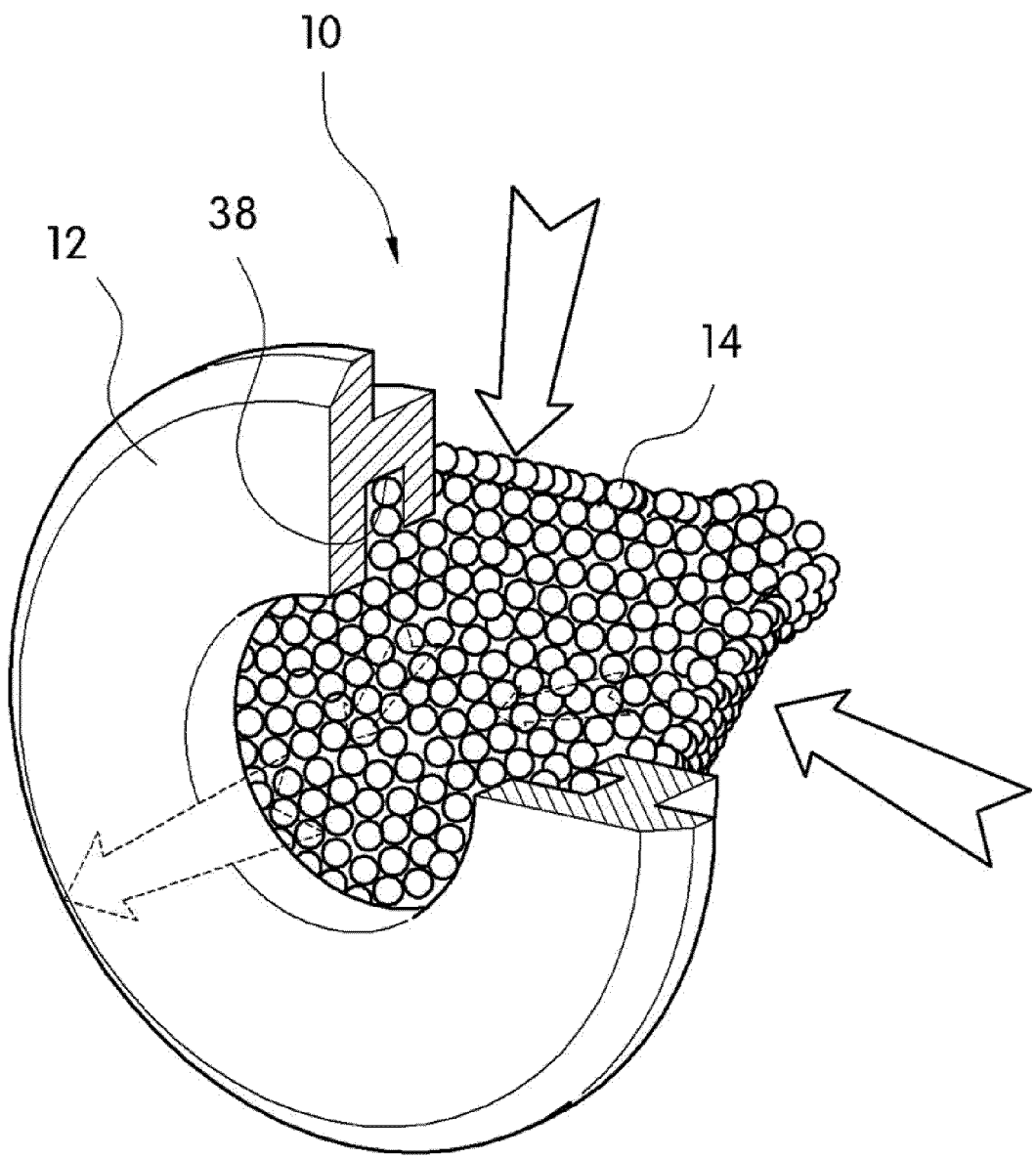

According to certain embodiments, for example as shown in FIG. 1, FIG. 1 is an exploded perspective view illustrating the construction of a receptacle filter according to certain preferred embodiments, for suitably charging hydrogen, according to a preferred embodiment of the present invention. According to further preferred embodiments, for example as shown in FIG. 2, FIGS. 2A and 2B are perspective views showing a metal powder filtering member which according to certain preferred embodiment is a critical part of the receptacle filter according to the present invention.

In further exemplary embodiments of the present invention, and as mentioned above, when charging a hydrogen tank with hydrogen, a hydrogen charging receptacle which is a kind of connector is preferably used. Preferably, a filtering unit which suitably filters hydrogen gas to remove impurities therefrom and a check valve which suitably controls the flow of filtered hydrogen gas such that it flows only in one direction are preferably installed in the receptacle body along an imaginary line.

In further preferred embodiments, the present invention is characterized in that the filtering unit installed in the receptacle body is suitably manufactured by heating and sintering metal powder.

Preferably, the filtering unit 10 includes an annular support body 12 which is suitably coupled to the check valve 20 and supports it, and a metal powder filtering member 14 which is suitably integrally formed on the front surface of the annular support body 12 by sintering.

Preferably, the metal powder filtering member 14 is formed in such a way that metal powder is suitably charged into a mold having a desired size and shape and the charged metal powder is heated and sintered in the mold such that particles of the metal powder are suitably bound to each other. Preferably, fine pores having diameters ranging from 25 µm to 75 µm, preferably from 40 µm to 50 µm are suitably formed between the bound particles of the metal powder and allow hydrogen to pass therethrough to remove impurities from hydrogen gas.

In further preferred embodiments, and in particular with regard to the method of integrating the conical metal powder filtering member 14 with the annular support body 12, the support body 12 that is suitably functioning as a base is first formed in a ring shape, and a metal mold having a cavity for seating the support body 12 therein and a conical cavity is suitably manufactured. Thereafter, the support body 12 is preferably seated into the metal mold and metal powder is suitably charged into the mold. In further preferred embodiments, the metal mold is heated to a predetermined temperature. Preferably, the metal powder filtering member 14 becomes integrated with the support body 12, thus suitably forming the filtering member 14. Preferably, the completed filtering unit 10 is then separated from the metal mold.

According to further preferred embodiments, a coupling depression 38 is suitably formed in the circumferential inner surface of the support body 12 to suitably ensure reliable coupling force between the support body 12 and the metal powder filtering member 14.

According to certain preferred embodiments, metal powder for the metal powder filtering member 14 may be selected from, but not limited to, among bronze of 90% Cu-10% Sn, copper, SUS304, SUS304L, SUS308, SUS316, SUS321, SUS347, brass, copper-nickel alloy and aluminum alloy. Preferably, in certain embodiments, because the filtering member comes into direct contact with hydrogen when charging hydrogen, or further, because the filtering member is exposed to the hydrogen atmosphere, it is preferable that bronze of 90% Cu-10% Sn which is resistant to hydrogen brittleness be suitably used as the metal powder.

According to further preferred embodiments of the invention, it is widely known that a phenomenon of hydrogen-induced damage of copper alloy is mainly induced in the case where copper preferably contains oxygen. For example, because tough pitch copper (UNSC11000) containing a small quantity of $Cu_2O$ is sensitive to hydrogen brittleness, according to certain preferred embodiments of the present invention, it is preferable that oxygen-free copper or deoxidized copper be used under the hydrogen atmosphere. Preferably, in consideration of these points, in the present invention, the filtering member 14 is made of bronze alloy of 90% Cu-10% Sn which has superior corrosion resistance and is generally insensitive to the phenomenon of hydrogen-induced damage.

Accordingly, the conical filtering member 14 is suitably formed by heating bronze powder of 90% Cu-10% Sn to a predetermined temperature and sintering it. Preferably, in further related embodiments, particles of bronze powder do not remain suitably separated from each other but become bound to each other while having a ductile fracture surface rather than having a brittle fracture surface.

In certain exemplary embodiments, for example as shown in FIG. 2, the filtering member 14 which is made of bronze powder of 90% Cu-10% Sn is preferably formed in a conical shape which is suitably reduced in diameter from the proximal end thereof adjacent to the front surface of the annular support body 12 to the distal end thereof. According to certain embodiments, the reason for this is that a contact surface area between the filtering member 14 and hydrogen drawn from an opening of the receptacle body 30 can be suitably maximized.

Figure 3:
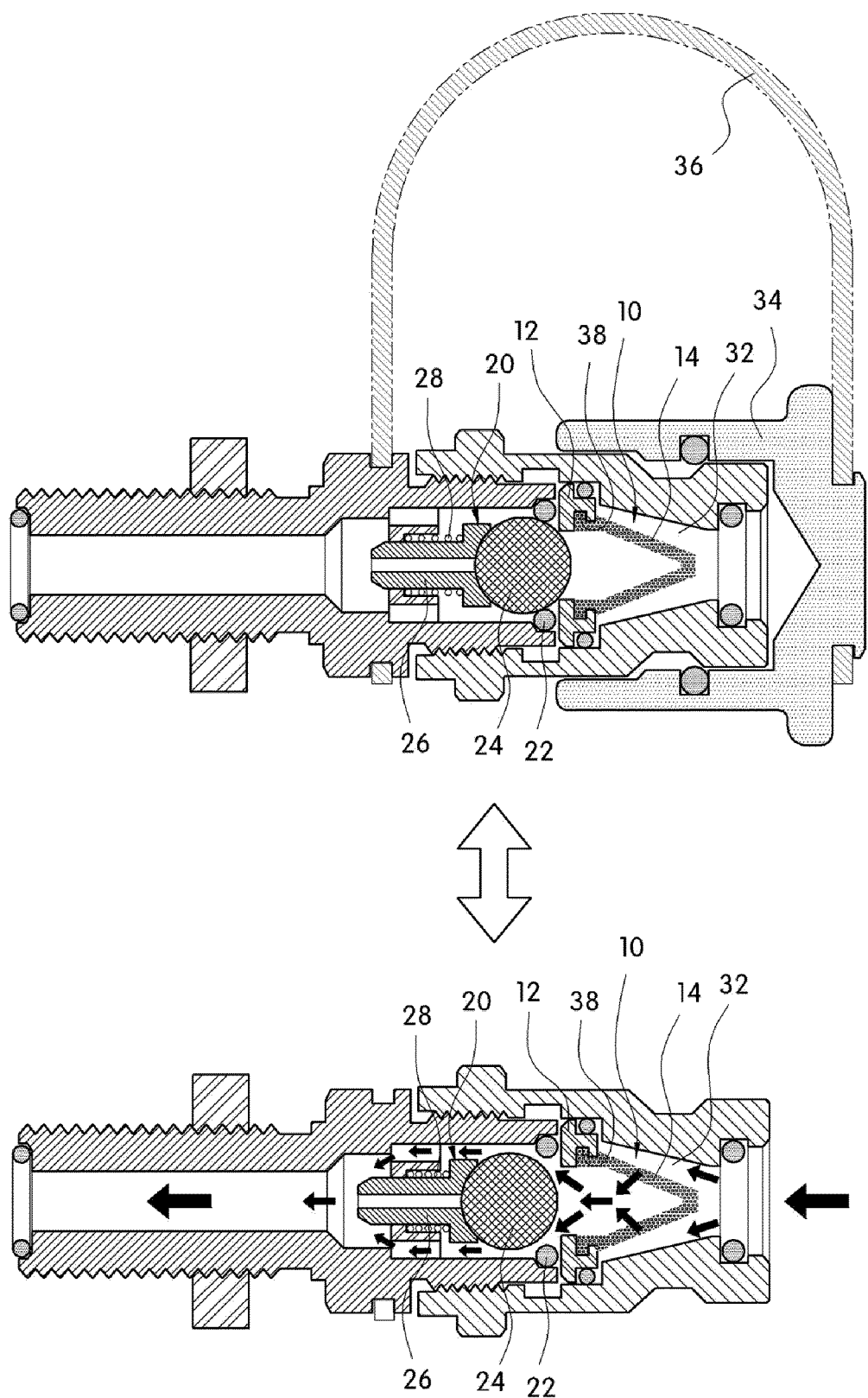
FIG. 3 is of sectional views illustrating the assembled state of the receptacle filter according to preferred embodiments of the present invention.
Figure 4:
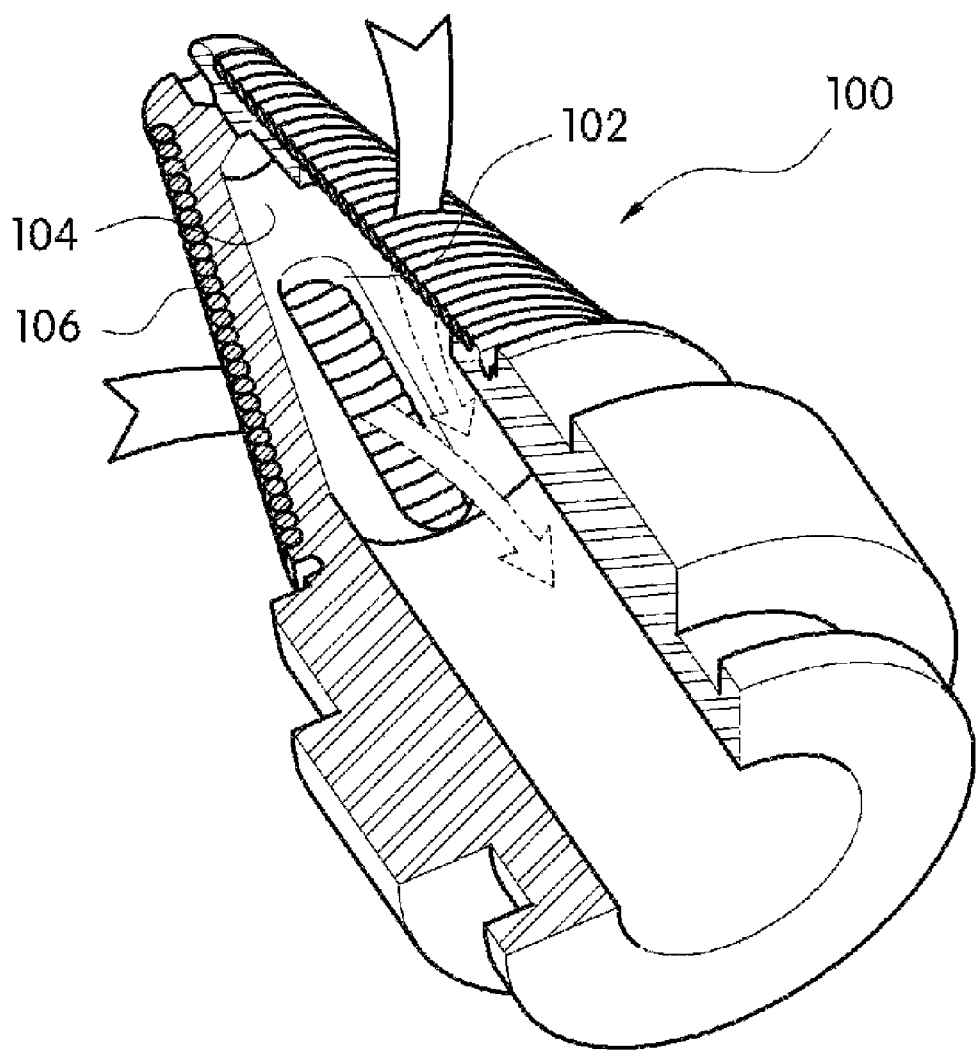
FIG. 4 is a partially broken perspective view showing a conventional receptacle filter.

Preferably, the general construction of the receptacle filter having the metal powder filtering member 14 according to certain preferred embodiments of the present invention will be explained below. For example, according to certain preferred embodiments and as shown in FIG. 3, the conical metal powder filtering member 14 integrated with the annular support body 12 is suitably disposed in the front end of the receptacle body 30. Preferably, the check valve 20 including a ball 24, a ball seat 26 and a spring 28 is suitably disposed behind the annular support body 12. In further preferred embodiments, an O-ring 22 is suitably interposed between the check valve 20 and the annular support body 12.

In further detail according to preferred embodiments, with regard to the installation of the conical metal powder filtering member 14 in the cylindrical receptacle body 30, a gap 32 of a suitably predetermined size is defined between the circumferential outer surface of the conical metal powder filtering member 14 and the circumferential inner surface of a portion of the receptacle body 30 which is adjacent to the opening into which hydrogen gas is drawn.

Referring to the drawings, the reference numerals 34 and 36 respectively denote a cap and a connector which suitably function as a stopper when the receptacle is not being used in the hydrogen charging operation.

Accordingly, in the present invention, when charging hydrogen into a hydrogen tank (not shown), hydrogen gas is smoothly supplied from the opening of the receptacle body 30 into the gap 32. Preferably, hydrogen gas that is drawn into the gap 32 comes into contact with the surface of the metal powder filtering member 14 which has a conical shape to suitably maximize the contact surface area. Preferably, impurities which have been contained in the hydrogen gas are suitably caught by the filtering member 14. According to further preferred embodiments, the hydrogen gas from which impurities are suitably removed consecutively passes through the fine pores of the filtering member 14 and the check valve 20 and flows towards the hydrogen tank.

As described above, according to preferred embodiments of the present invention as described herein, a filtering member is suitably formed by heating and sintering powder of copper or a copper alloy such that particles thereof are bound to each other. In preferred embodiments as described herein, the filtering member is suitably installed in a receptacle for charging hydrogen. Accordingly, the present invention reliably conduct a function of removing impurities from hydrogen and can also suitably reduce the number of components and simplify the structure, thus markedly reducing the production cost, compared to the conventional filter.

What is claimed is:

1. A receptacle filter for charging hydrogen comprising: a filtering unit to remove impurities from hydrogen gas; and a one-way valve for controlling a flow direction of the hydrogen gas,
    wherein the filtering unit comprises: a support body coupled to the one-way valve to support the one-way valve; and a metal powder filtering member integrally provided on a front surface of the support body, and
    the metal powder of the filtering member comprises 90% Cu-10% Sn which is resistant to hydrogen brittleness.

2. The receptacle filter of claim 1, wherein the filtering member has a conical shape which is reduced in diameter from a proximal end thereof adjacent to the front surface of the support body to a distal end thereof.

3. The receptacle filter of claim 1, wherein the metal powder filtering member is formed by seating the support body into a mold, charging metal powder into the mold ahead of the support body, and heating the metal powder at a predetermined temperature and sintering the metal powder such that the particles of metal powder are bound to each other and fine pores are formed therein.

4. A receptacle filter for charging hydrogen comprising:
    a filtering unit to remove impurities from hydrogen gas; and
    a one-way valve for controlling a flow direction of the hydrogen gas, wherein the filtering unit comprises a support body coupled to the one-way valve to support the one-way valve and a metal powder filtering member, and the metal powder of the filtering member comprises 90% Cu-10% Sn which is resistant to hydrogen brittleness.

5. The receptacle filter for charging hydrogen of claim 4, wherein the metal powder filtering member is integrally provided on a front surface of the support body.

6. The receptacle filter of claim 4, wherein the filtering member has a conical shape.

7. The receptacle filter of claim 6, wherein the conical shape is reduced in diameter from a proximal end thereof adjacent to the front surface of the support body to a distal end thereof.

8. A motor vehicle comprising the receptacle filter for charging hydrogen of claim 1.

9. A motor vehicle comprising the receptacle filter for charging hydrogen of claim 4.

* * * * *